US006882853B2

(12) United States Patent
Meyers

(10) Patent No.: US 6,882,853 B2
(45) Date of Patent: Apr. 19, 2005

(54) METHOD AND ARRANGEMENT FOR ARRANGING, SELECTING AND DISPLAYING LOCATION DATA IN A CELLULAR TELEPHONE SYSTEM, AND A TERMINAL OF A CELLULAR NETWORK

(75) Inventor: Stephan Meyers, Los Angeles, CA (US)

(73) Assignee: Nokia Mobile Phones Ltd., Espoo (FI)

( * ) Notice: Subject to any disclaimer, the term of this patent is extended or adjusted under 35 U.S.C. 154(b) by 552 days.

(21) Appl. No.: 09/892,265

(22) Filed: Jun. 27, 2001

(65) Prior Publication Data

US 2002/0019224 A1 Feb. 14, 2002

(30) Foreign Application Priority Data

Jun. 28, 2000 (FI) .............................. 20001534

(51) Int. Cl.[7] ................................ H04Q 7/20
(52) U.S. Cl. ................ 455/457; 455/456.1; 455/456.2; 455/456.3
(58) Field of Search .................... 455/412.1, 456.1, 455/456.2, 456.3, 456.5, 456.6, 457, 484, 414.1, 414.2, 422.1; 340/990, 905, 988, 995; 701/211, 213, 201, 208, 200, 212, 23–26; 342/357.13

(56) References Cited

U.S. PATENT DOCUMENTS

| 3,602,702 | A | | 8/1971 | Warnock ..................... 345/421 |
| 4,972,319 | A | | 11/1990 | Delorme |
| 5,237,323 | A | | 8/1993 | Saito et al. |
| 5,699,255 | A | * | 12/1997 | Ellis et al. .................. 701/212 |
| 6,075,467 | A | * | 6/2000 | Ninagawa .............. 340/995.14 |
| 6,314,295 | B1 | * | 11/2001 | Kawamoto ............... 455/456.2 |
| 6,546,334 | B1 | * | 4/2003 | Fukuchi et al. ............. 701/208 |

FOREIGN PATENT DOCUMENTS

| DE | 19527786 A1 | 8/1996 |
| WO | WO 98/56197 | 12/1998 |
| WO | WO 00/23767 | 4/2000 |

* cited by examiner

Primary Examiner—Jean A Gelin
(74) Attorney, Agent, or Firm—Perman & Green, LLP.

(57) ABSTRACT

The invention relates to a method and arrangement for using location data in a cellular network. The cellular network includes a centralized map data bank (454) in which the map data are arranged in accordance with the quadtree hierarchy. The terminal includes a presentation means (23) for displaying map data according to the quadtree hierarchy. Some of the terminal's function keys (29) are arranged so as to function as selection keys for fetching more detailed map screens of the quadtree hierarchy to the display. The map data and possible auxiliary data fetched from the map data bank are saved in the terminal's memory for later use.

20 Claims, 4 Drawing Sheets

METHOD AND ARRANGEMENT FOR ARRANGING, SELECTING AND DISPLAYING LOCATION DATA IN A CELLULAR TELEPHONE SYSTEM, AND A TERMINAL OF A CELLULAR NETWORK

The invention relates to a method for displaying map data from a map data bank on a terminal of a cellular network, comprising a step in which a map data search from a data bank is started at the terminal, a step in which map data are transferred to the terminal, steps of enhancing the level of detail of the map displayed on the terminal, and a step in which the map data are shown on the display of the terminal. The invention further relates to a location data arrangement in a cellular telephone system, which arrangement comprises a map data bank in connection with a cellular network, a terminal of a public cellular network, the display of which terminal is adapted so as to function as a map display, and a GPS positioning device in the terminal. The invention further relates to a terminal of a cellular system, which terminal comprises means for receiving map data from a base station, means for saving and displaying map data, means for inputting data to the terminal, means for transmitting messages and means for realizing GPS positioning.

Communication in various cellular systems is developing rapidly. Even with the current second-generation devices it is possible to communicate with different data networks and data banks. Emerging third-generation devices will multiply the quantity and quality of services. One such forthcoming service is the sending/displaying of location information at a terminal of cellular network. Already now there are cellular devices available with GPS (Global Positioning System) functionality realized in them. Maps can be downloaded from data banks into the terminal's memory, on top of which maps the terminal will place the location information obtained through GPS. The user is thus able to locate him/herself on the map and take the necessary orientation measures.

What is problematic, however, is the transfer of map data at the desired level of detail from the data banks to the terminal in real time. The more detailed the map data that are wanted, the more data must to be transferred from a local map data bank to the terminal, if the data in the data bank are stored, as is usual, in one big location data entity. Such manner of storing data means in practice that when the user wants to move to another undisplayed map or zoom in on the map viewed or see some additional information related to the map, a great amount of data must be transferred from the data bank to the terminal again and again. After that, these data have to be updated on the display at the terminal. This retrieval of data in the data bank and its retransmission to the user's terminal and the updating of the display takes time and uses limited communication resources.

Figure 1:
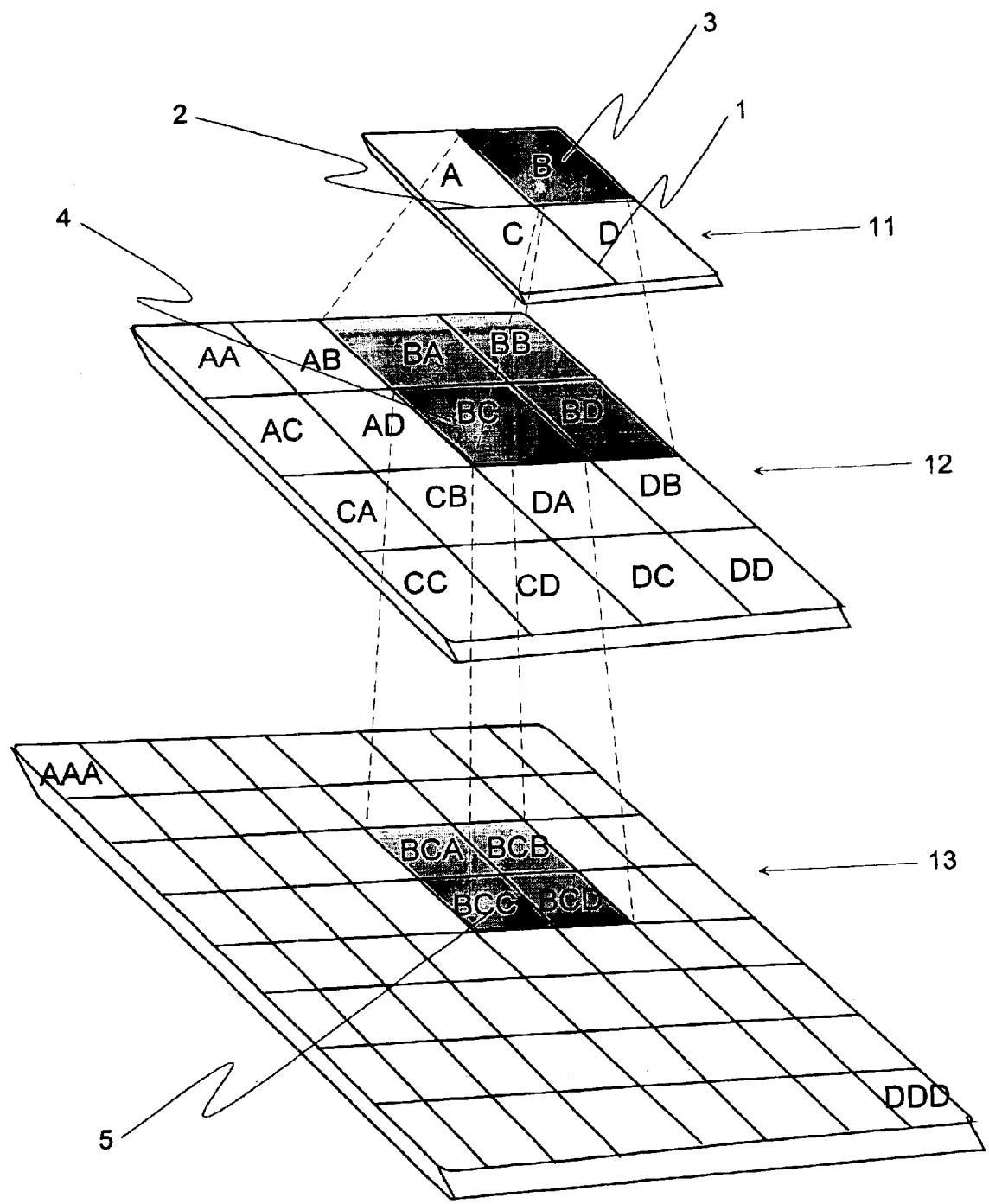

U.S. Pat. No. 3,602,702 discloses a hierarchic data storage method that is also applicable to the storage of map data. FIG. 1 shows by way of example the principle of this data storage method, when applied to the processing of map data in accordance with U.S. Pat. No. 4,972,319. In this method the map is first presented on an initial map drawn at rather a low resolution, level 11 in FIG. 1. This map, however, can be divided into four equal portions by two perpendicular axes 1 and 2. Thus we have map sections A, B, C and D in FIG. 1. However, in the exemplary situation depicted in FIG. 1 the user wants to have more detailed information about section B, reference numeral 3. More detailed data BA, BB, BC and BD (hierarchy level 12) for the section B are then fetched from the map data bank; these have been achieved by dividing section B into four equal parts just like the original map. These four more detailed maps are fetched from the map data bank onto the display of the terminal. If still more detailed data are required for any one of the currently displayed subsections, like subsection BC (reference numeral 4) in the example of FIG. 1, a new division into four parts can again be made, as has been done in the example of FIG. 1, depicted by level 13 in the figure. In the example of FIG. 1, the user is satisfied with the level of detail provided by level 13, by means of which he or she finds out the location of an object in area BCC, reference numeral 5, with the accuracy desired. Naturally, there may be more map detail levels than the three levels shown in FIG. 1. The number of levels may be limited e.g. by the accuracy of stored information or the resolution of the display device. Each one of the map sections contained in levels 11, 12 and 13 in the example of FIG. 1 has been separately stored in the map data bank as an individual record, and they are retrieved from the map data bank always in these entities. Thus the map data bank contains separate records for map sections A, B, C, D, AA, AB, AC, AD, BA, BB, . . . , DD, AAA, . . . , DDD. In the example of FIG. 1, eighty-four records have been stored in the map data bank concerning the map of the area at three different detail levels. This kind of an information organization method is called a quadtree in the English text.

U.S. Pat. No. 5,237,323 discloses a method in which adjacent map data associated with the map displayed are locally stored in the terminal for possible subsequent use. This method for its part shortens the time consumed in the fetching of map data if the new map fetched belongs to these locally stored map data. The data storage hierarchy is not, however, the quadtree storage hierarchy.

In connection with map-based information retrieval one often wants to get information which is not as such linked to any map record of the map data bank being displayed at that moment. Such a case could be e.g. the storing of an overall map, which is larger than the map displayed, in the terminal for possible later use. Similarly, there may be need to store some other user-specific information in the map data bank. In a prior-art system, this information must be brought onto the display of the terminal separately with each map display from the common map data bank.

A third practical problem concerns the user interface of the cellular terminal which is to be used for controlling the processing of a given map on the terminal's display. Some terminals do not have display manipulation keys at all. In some terminals the display can be controlled using e.g. a "mouse coupling", whereby a map area, which is to be viewed in more detail, is defined by a mouse. Some kind of a pointer/cursor may also be moved on the terminal's display screen using so-called scrolling keys. So-called touch keys in connection with the display are also known which may be used to control the operation of the display in the terminal. All these alternative display control mechanisms require the use of a separate functional device to control the display. This for its part increases the number of interfaces in the terminal, thus making the apparatus in question more complex.

An object of the present invention is to provide a new type of data storage and retrieval, display control and display method arranged to operate in connection with the operation of a cellular terminal, which method can be used to quickly zoom in on a map displayed at the cellular terminal and on the same occasion show information other than the map data proper on the display of the terminal.

The objects of the invention are achieved by a map data storage and display arrangement which applies a hierarchic quadtree method in the terminal. When zooming in on the map data displayed on the terminal, only the necessary portions of the quadtree are retrieved and stored in the terminal's memory. In place of the unused quadtree portions it is possible to save at the same time information of interest to the user which does not belong to the map data proper.

The map data display method according to the invention is characterized in that the map data in the map data bank are arranged in a map hierarchy according to the quadtree system and that the map data retrieved from the map data bank are displayed on the display of the terminal according to the quadtree system.

The cellular telephone system location data arrangement according to the invention is characterized in that the map data in a map data bank of a cellular telephone system are arranged in quadtree format.

The terminal according to the invention is characterized in that the terminal is arranged so as to save in its memory map data in accordance with the quadtree system.

Advantageous embodiments of the invention are specified in the dependent claims.

The basic idea of the invention is as follows: A map data bank used by a cellular terminal, which advantageously also includes a GPS positioning device, is organized in accordance with the quadtree system. How many different levels the quadtree has is determined case by case. Corresponding quadtree display functionality is provided in the terminal's display by dividing it similarly into four equal parts when displaying map data. Advantageously four different keys are arranged in the terminal so as to function as a selection means for a displayed map section according to the quadtree system. By pushing one of the said keys a map display of the next more detailed level according to the quadtree system is fetched onto the terminal's display, which map display is further divided into four parts on the terminal's display. The four sections of the quadtree map of the level preceding the map level now displayed on the terminal are advantageously at this stage saved in the terminal's memory for possible future use, whereby there will be no need to re-retrieve them from the map data bank proper. The GPS positioning device may be advantageously used to determine at a rough level the geographical area for which map data are fetched from the map data bank at the first stage. The user proceeds to a more detailed map according to the quadtree system as long as he or she desires or until the most detailed map presentation level stored in the map data bank is reached or until the resolution of the display of the terminal begins to limit the presentation of the map data.

Instead of saving maps of the preceding levels of the quadtree it is possible to save in the terminal's memory some additional information of interest to the user, which additional information as such is not directly associated with the map displayed. Thus this information can be advantageously shown in connection with the display of any map according to the quadtree system. For how long the saved quadtree sections are stored in the terminal's memory is advantageously determined case by case. The data may be erased from the memory after a certain predefined time or e.g. when the map application is closed.

An advantage of the invention is that by saving in the unused quadtree sections in the terminal map data already once retrieved/displayed, these data can be quickly returned onto the terminal's display when they are possibly needed again. This at the same time eliminates the need for re-transferring the data in question from the map data bank proper to the terminal via a wireless link.

Another advantage of the invention is that in the unused quadtree sections in the terminal it is possible to save other information of interest to the user, which information may be displayed on the terminal in conjunction with any map screen according to the quadtree system.

A further advantage of the invention is that the map data are fetched to the terminal's display faster because only the necessary map data defined at a given quadtree level are retrieved from the map data bank. Utilization of the invention eliminates repeated searches of the entire map data bank since only the map data related to the quadtree branch in question are searched.

A further advantage of the invention is that by using the quadtree method it is possible to use, when fetching a map for presentation, a display arranged so as to become more detailed in a stepwise manner, which further speeds up the process of bringing the map onto the display. Thus the user of the terminal may, if necessary, direct the terminal's display to the correct quadtree branch already at this rough temporary presentation level and the user need not wait for the map to be completely drawn on the display of the terminal.

A further advantage of the invention is that when enhancing the display the terminal may utilize the number/function keys already in the terminal, and no additional means are required for processing the map.

Figure 3:
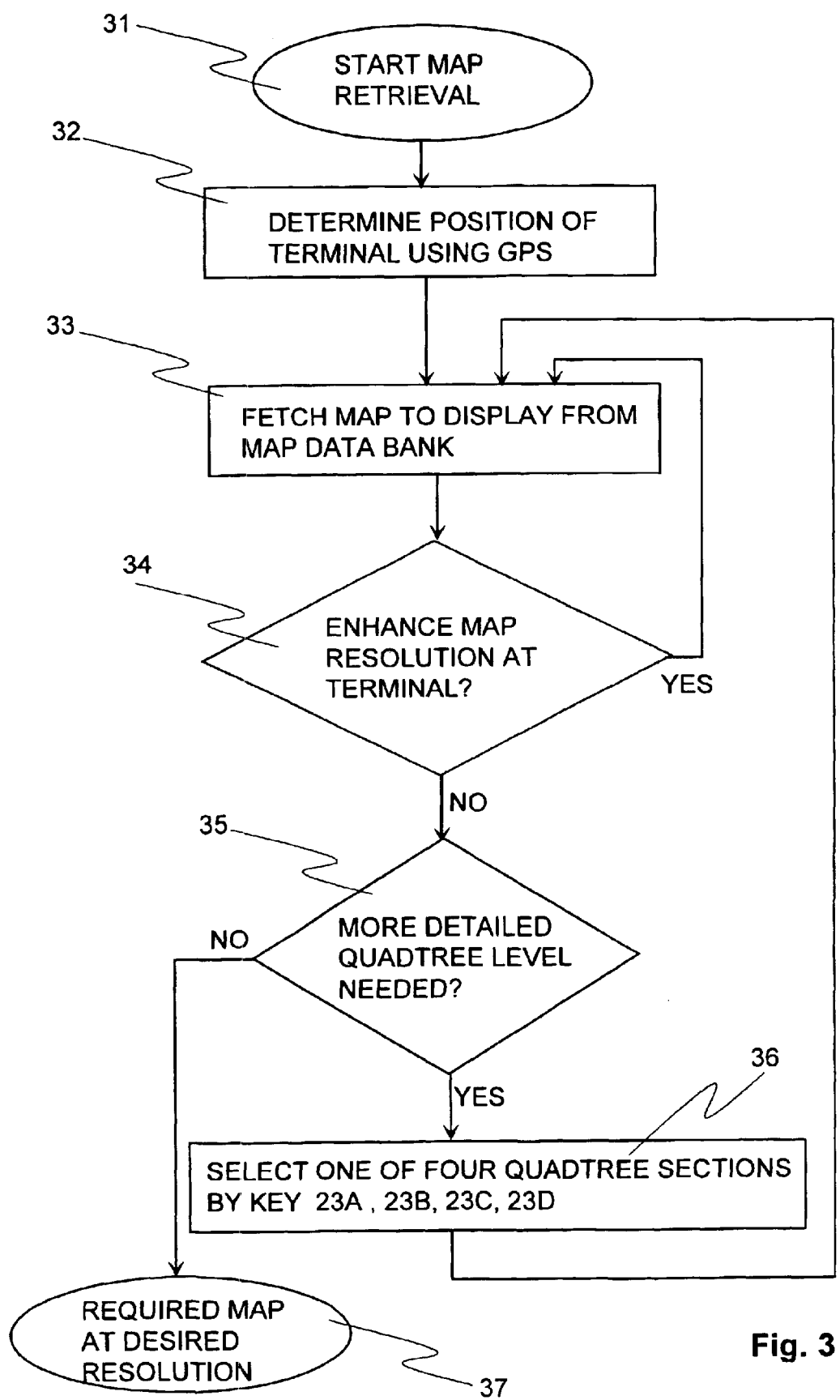
Figure 4:
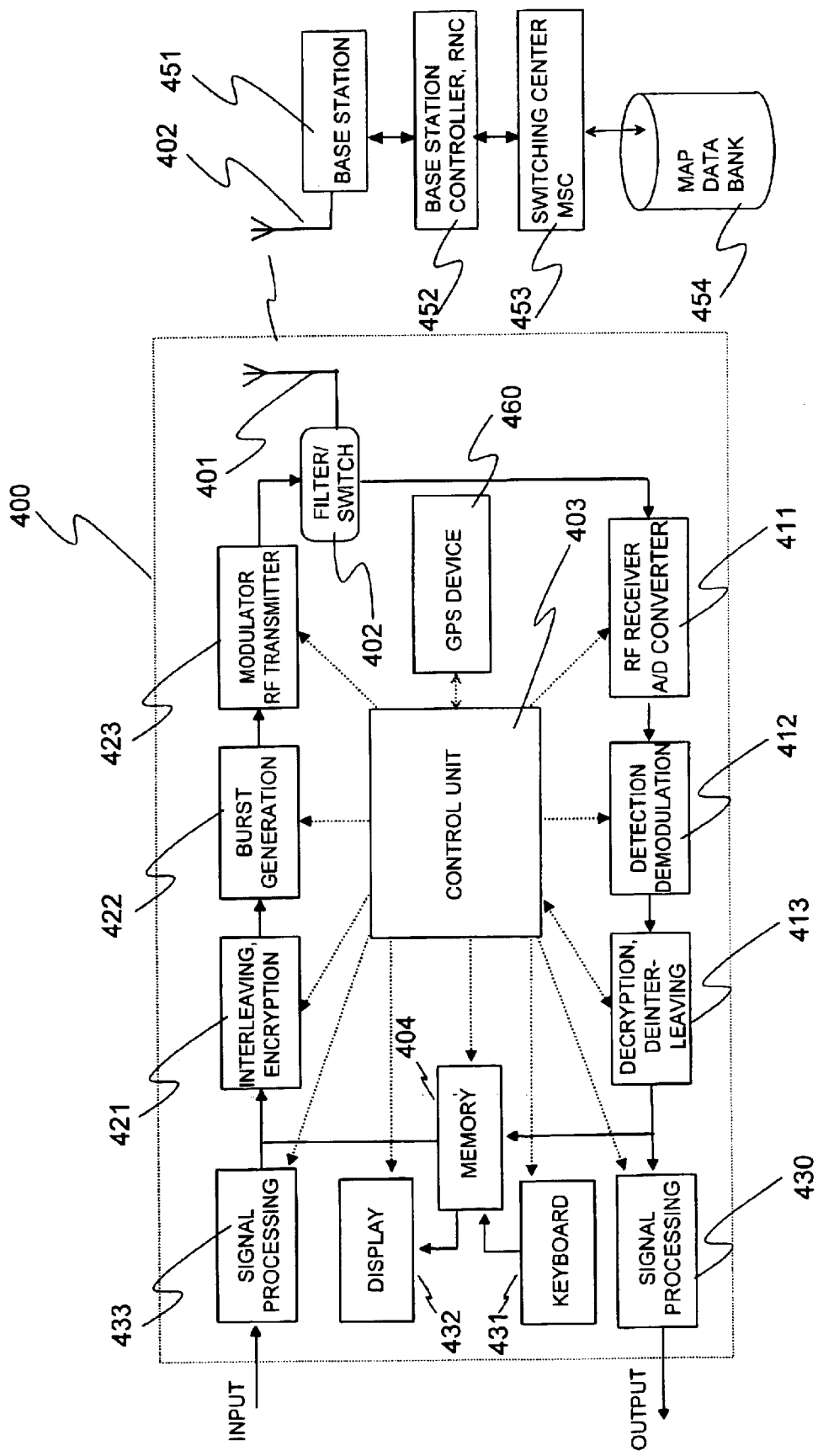

The invention is below described in detail. Reference is made to the accompanying drawings in which FIG. 1 shows by way of example a map file/data bank arranged in accordance with the quadtree system, FIG. 2 shows by way of example a cellular terminal and its display and keyboard when they are used according to the invention, FIG. 3 shows by way of example a flow diagram of the method according to the invention for fetching map data and displaying it on a cellular terminal, and FIG. 4 shows by way of example the principal elements of a terminal according to the invention and a map data bank connected with a cellular network.

The exemplary quadtree arrangement shown in FIG. 1 was discussed in conjunction with the description of the prior art.

Figure 2:
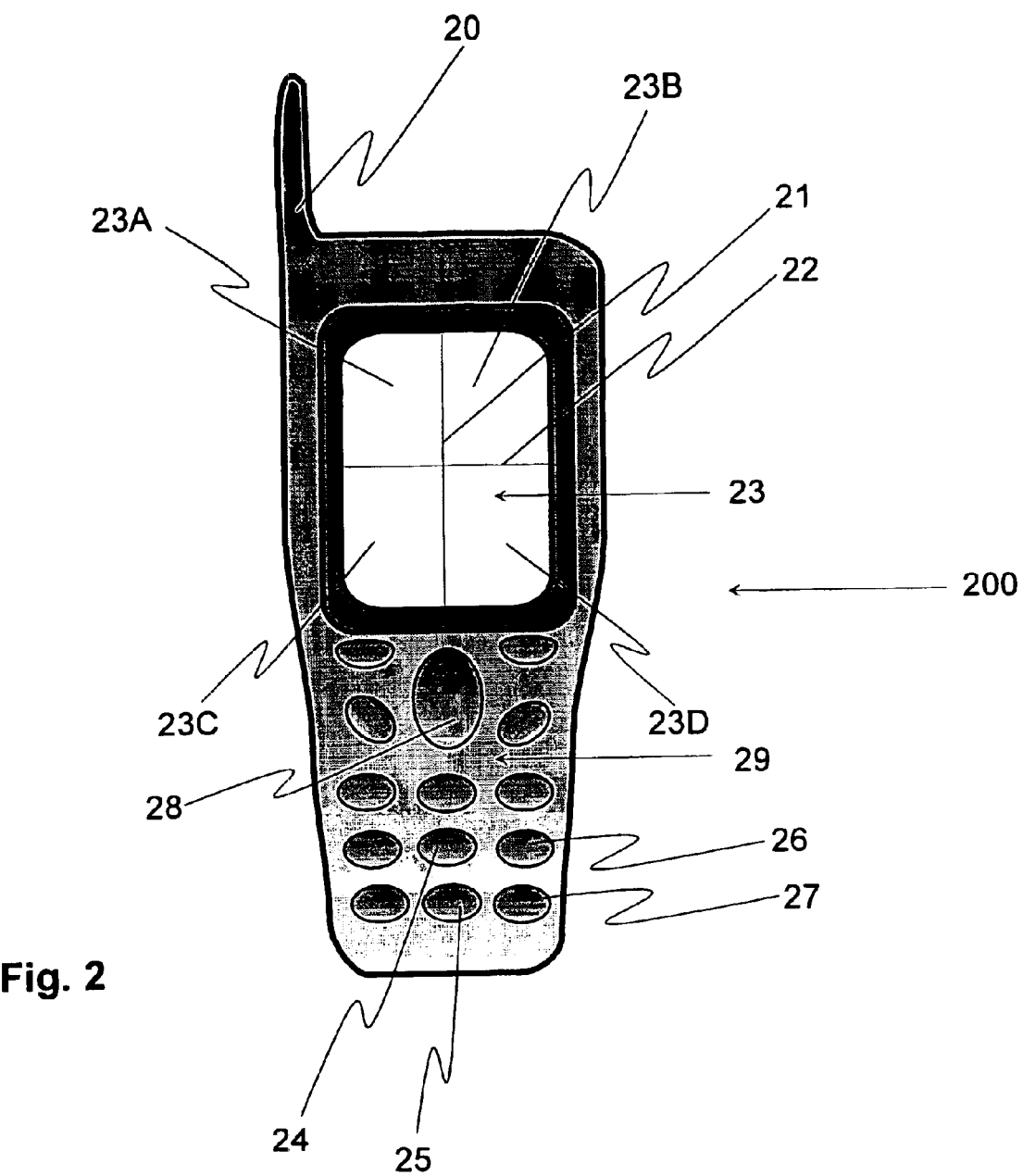

FIG. 2 shows by way of example a cellular terminal 200 applying the map display arrangement according to the invention. The terminal 200 comprises an antenna 20 for establishing and maintaining a connection with a cellular network's base station, a display 23 for presenting various data, and a keyboard 29 for inputting data to the terminal or controlling the operation of the terminal. In addition, the terminal comprises the functionally essential electronic components such as a functional control unit, memory and a GPS positioning device, which are not specifically shown in the figure. As regards the operation of the invention, the essential components include the display 23, keyboard 29, the functional control and memory units and the GPS positioning device in the terminal.

In the arrangement according to the invention the map database utilized by the terminal is stored in some external map data bank according to the quadtree system. The map data bank is connected in a fixed manner to an element in the cellular network, with which element the terminal may establish a communication connection. When required, the terminal fetches the map data from this data bank through the cellular network. Since the map data bank is arranged in the quadtree format, also the display of the terminal is advantageously divided into four equal-sized parts 23A, 23B, 23C and 23D by lines 21 and 22 shown on the display 23. These lines may be created electronically by the display itself or an auxiliary mask may be used on top of the display when using map applications. When a map according to a quadtree level is fetched from the map data bank, the map fetched and displayed comprises four subrecords; the first subrecord (top left quarter) displayed on screen section 23A, the second subrecord (top right quarter) displayed on screen section 23B, the third subrecord (bottom left quarter) displayed on screen section 23C, and the fourth subrecord (bottom right quarter) displayed on screen section 23D.

The keyboard 29 in the exemplary terminal 200 of FIG. 2 comprises 14 separate keys. At the lower portion of the terminal there is a 3×3 matrix of nine alpha-numeric keys in order to type in a phone number or text message. At the upper portion there is also shown by way of example five keys controlling the call setup functions and the memory of the device. In the case depicted by FIG. 2 the four keys 24, 25, 26 and 27 at the bottom right corner of the terminal have been selected as the keys controlling the operation of the display in conjunction with quadtree map functions. Naturally it is possible to choose any other key combination as well to control the operation of the display.

The map retrieval function is started at the terminal using a predefined key or key combination. Advantageously the GPS locator in the terminal provides information at a rough level about the geographical position of the terminal. On the basis of this position information the terminal fetches from the map data bank the map subrecords according to the first (roughest map level) level of the quadtree map display. Advantageously the level to be fetched first can be defined specifically for each user/terminal. At the next stage the user may, if he or she wants, opt for more detailed map data on one of the quarters 23A, 23B, 23C or 23D of the display 23. This is done by pressing one of the keys 24, 25, 26 or 27. In the exemplary situation depicted in FIG. 2 a press of key 24 means that the user wants to have more detailed map data for screen quarter 23A. Similarly, a press of key 26 means that the user wants to have more detailed data for screen quarter 23B. Key 25 is used to zoom in on screen quarter 23C, and key 27 is used to zoom in on screen quarter 23D. Using this technique, the user zooms in on the map until the level of detail is as desired. The zooming comes to an end also when the best possible map detail level has been retrieved from the map data bank or when the resolution of the terminal's display no longer is able to show any smaller details on the map.

Return to the previous map display level can be advantageously realized by pressing some other key on the terminal. In the example case depicted by FIG. 2 it is realized by pressing key 28.

When the terminal fetches map records of a new more detailed quadtree level, it advantageously saves in the terminal's memory the map records of the previous displayed quadtree level. This is desirable as the user often moves back and forth on the various detail levels of the map when looking for a certain site/address.

In addition to map data proper a map data bank may contain other permanent or variable information of interest to the user in the area examined. These data, too, are advantageously copied from the map data bank to the terminal's memory whence they can be quickly fetched when needed and displayed in conjunction with any map screen shown on the terminal. Such an auxiliary database could e.g. contain information about road work on roads displayed on the map screen or information about the traffic on a section of a road. These data can be displayed in connection with any map screen belonging to a quadtree if the user wants. Another example of additional information stored in the database concerns a situation in which accurate site-specific measurement data of a cellular network are saved in the map database, which data are later used in network planning and maintenance. A third example of additional information stored in the database consists of adding graphic information about sites or buildings. The user of the terminal may utilize these pictures in various decision-making situations.

Map data retrieval may also be sped up by means of the following procedure. Map data brought on the display of the terminal is always enhanced in a stepwise manner towards the desired level of detail. When map data is fetched from the map data bank applying the method according to the invention, the fetched quadtree map data screen is not drawn at the final resolution at once, but a map drawn at a coarse resolution is first shown in each of the four display blocks of the terminal. If necessary, this map is at the next stage drawn again at a finer resolution. This way, the display of the terminal becomes gradually more detailed until the final map display resolution at that quadtree level is reached or the user selects the next quarter to be drawn in more detail. With this method the user can reach the desired map location at the desired resolution more quickly because map portions that are of no interest to the user will not be drawn at too high a resolution on the display of the terminal.

The exemplary flow diagram in FIG. 3 shows how the method according to the invention is utilized on a cellular terminal. The terminal's map function is started in step 31. Starting may be advantageously realized by pressing a key or by voice control. After starting, the current geographical position of the terminal is advantageously determined by the GPS positioning device. In step 33 the terminal fetches from the map data bank the map corresponding to the position determined on the coarsest presentation level. The data of the map displayed are arranged according to the quadtree system in four different subrecords. Drawing of the subrecords on the terminal's display is carried out gradually so that at first each quadtree section is drawn at a coarse level. If the user wants a better resolution, a decision is made in step 34 to re-draw the map consisting of the same quadtree sections at a better resolution. If all the map data that is needed in the drawing of the map has not yet been fetched from the map data bank, it is fetched at this stage. On the basis of these data the map is re-drawn at a higher resolution. This feedback for the display/drawing enhancement is used as long as the user wants or until all the map data in the map data bank has been used for drawing the map on the display of the terminal.

If the drawing resolution of the map displayed is sufficient, the process moves on to step 35 in which a decision is made about whether the map displayed on the terminal is detailed enough. If the user is satisfied with the level of detail, nothing is done, bringing the process to step 37 in which the map wanted by the user is presented at the desired level of drawing/display.

If, however, there is need to enhance the level of detail of the map displayed on the terminal, the process moves on from step 35 to step 36. In the example case depicted in FIG. 3 the user of the terminal may press one of the keys 23A, 23B, 23C and 23D and thus select the quadtree quarter for which he or she wants to have more detailed map data. After the selection there follows step 33 again where four new map records are fetched from the map data bank, displaying the selected screen quarter in more detail. These map records are drawn in the stepwise manner described above on the terminal's display. This feedback is used until in step 35 the user decides that the map displayed is detailed enough.

Advantageously in step 36 the quadtree sections just removed from the display are also saved in the terminal's memory. These saved map data are used if the user of the terminal wants to return to the coarser level map screen. Thus there is no need to re-do a time-consuming data retrieval from the map data bank. In connection with the said saving of data it is possible to store characters/information that advantageously indicate the level of detail and/or usage history of the map presented in the quadtree section in question.

FIG. 4 shows in the form of a simplified block diagram a cellular terminal 400 applying the method according to the invention and its connection to a cellular system. The terminal comprises an antenna 401 to receive radio-frequency, or RF, signals sent by base stations 451. A received RF signal is conducted by a switch 402 to a RF receiver 411 where the signal is amplified and converted digital. The signal is then detected and demodulated in block 412. Block 413 performs deciphering and deinterleaving. Signal processing is then performed in block 430. The received data, which is map data or auxiliary data associated with it according to the invention, may be saved as such in the terminal's memory 404. A control unit controls the aforementioned receiving blocks in accordance with a program stored in the unit.

Transmission from a terminal is carried out e.g. as follows. Controlled by a control unit 403, block 433 performs possible signal processing on the data, and block 421 performs the interleaving and ciphering on the processed signal to be transferred. Bursts are generated from the encoded data in block 422 which are modulated and amplified into a transmission RF signal, block 423. The RF signal to be transmitted is conducted to an antenna 401 via a switch 402. Also the aforementioned processing and transmission functions are controlled by a control unit 403. The transmission functions are used in conjunction with the invention when a command is issued on the terminal to fetch from the map data bank more detailed map information on a given quadtree section.

In the terminal 400 depicted in FIG. 4 the components essential from the point of view of the invention include the GPS positioning device 460 and the prior-art receive blocks 411 to 413 by means of which the terminal receives, demodulates and decodes the map data/messages arriving via base stations, and the control unit 403 which processes the data contained in the messages and controls the operation of the terminal. Part of the terminal's memory 404 must be allocated for quadtree map records which are saved in the memory for possible future use. Naturally, for this same purpose it is possible to use a detachable memory means in association with the terminal, such as the known SIM card. For the display of map data it is needed a graphics-capable display unit 432 controlled by the control unit 403 either independently or through user commands entered at the keyboard 431. The said display unit should further be able to draw the quadtree map data boundaries in accordance with the fetched quadtree records. An alternative is to use a separate mask fitted on top of the display to separate the quadtree sections.

The requirements set by the invention on base stations 451, base station controllers 452 and switching centers 453 are relatively small compared with the prior art. Prior-art base stations compile and send numerous messages of different kinds so that compilation and transmission of messages concerning data contained in the map data bank 454 can be realized using prior-art means 451, 452. Connection from the map data bank 454 to the cellular network is advantageously realized via a switching center 453. Naturally, the connection with the map data bank can be realized via other elements of the cellular network as well.

Above it was described some advantageous embodiments according to the invention. The invention is not limited to the solutions described above. For example, the location of the terminal may be realized by other means than by the GPS technique discussed above. Similarly, the quadtree section to be enhanced on the display may be selected in some other manner than by pressing keys. The selection may be realized e.g. using a voice command or a light command, or the movements of the user's head or eye may control the operation of the arrangement according to the invention. Neither is the invention limited to the quadtree system only. Other map division systems may be used as well as the quadtree arrangement described above. The map data may be advantageously divided into two, nine or six equal parts. Furthermore, the inventional idea may be applied in many ways within the limits defined by the claims.

What is claimed is:

1. A method for displaying on a cellular terminal map data from a map data bank connected with a cellular network, which method comprises:

starting map data retrieval from a map data bank at the terminal, transferring the map data to the terminal, enhancing the map presentation on the terminal's display, and showing the map data on the terminal's display, wherein the map data contained in the map data bank are arranged in hierarchic map levels in the form of a quadtree to be enhanced in a stepwise manner so that when a map retrieval is started, a map of the coarsest hierarchic level is fetched to the terminal and the fetched map is divided on the display of the terminal into at least two equal-sized sections one of which can be selected by means of the terminal for a more detailed map data retrieval and presentation, and wherein map data contained in the map data bank are arranged into a map hierarchy according to a quadtree arrangement and map data fetched to the display are divided on the terminal's display screen into four equal-sized sections in the quadtree arrangement which correspond to quadtree map records retrieved from the map data bank.

2. A method according to claim 1 wherein the geographical position of the terminal in determined at the start of map data retrieval, after which a map record at the coarsest level of the map hierarchy is fetched to the terminal's display, which map record has the coordinates of the said geographical position.

3. A method according to claim 2 wherein the location for the terminal is carried out by a GPS positioning device in the terminal.

4. A method according to claim 1 wherein when one of the four equal-sized quadtree arrangement sections is selected, and after the selection, map data for this selected map section, which map data have been saved using a higher resolution, are fetched from the map data bank to the terminal's display.

5. A method according to claim 4 wherein the map data according to previous displayed quadtree level is saved in the terminal.

6. A method according to claim 5 wherein user-specific auxiliary data, which are not map data proper, are saved in the terminal so that the said auxiliary data may be shown in connection with any map display according to the quadtree arrangement map hierarchy.

7. A method according to claim 4 wherein the selection of one of the four displayed sections displayed on the terminal is realized by pressing a key on the terminal.

8. A method according to claim 1 wherein the quadtree arrangement fetched from the map data bank is drawn on the terminal's display so that it is enhanced step by step.

9. A location data arrangement in a cellular telephone system, comprising:
- a public cellular network,
- a cellular terminal having a display which is arranged to be used as a map display,
- a means at the terminal to determine a geographical position of the terminal,
- a map data bank connected with a cellular network,
- wherein map data in the map data bank are arranged in hierarchic map levels in the form of a quadtree that become more detailed step by step, and
- wherein map data fetched to the display are divided on the display into four equal-sized sections which correspond to quadtree map records retrieved from the map data bank.

10. A location data arrangement according to claim 9 wherein hierarchic map data in the map data bank in the cellular telephone system are arranged in the form of a quadtree.

11. A location data arrangement according to claim 9 wherein the means for determining the position of the terminal comprises a GPS positioning device.

12. A location data arrangement according to claim 9 wherein the map data fetched from the map data bank are arranged to be saved in the terminal for later use.

13. A location data arrangement according to claim 9 wherein user-specific auxiliary information, which does not belong to the map proper, is arranged to be saved in the terminal.

14. The arrangement of claim 9 wherein the four equal-sized sections of the display are arranged so as to correspond to subrecords of map records of the quadtree.

15. A cellular terminal comprising:
- a means for receiving map data from base stations,
- a means for saving into its memory map data, which is retrieved from a hierarchically arranged map data bank,
- a means for displaying retrieved map data,
- a means for inputting data to the terminal,
- a means for sending messages, and
- a means for determining the geographical position of the terminal, and
- wherein the display of the terminal is divided into four equal-sized map sections in the form of a quadtree, and each section is arranged so as to correspond to subrecords of quadtree map records.

16. A terminal according to claim 15 wherein one of the map sections on the display of the terminal is arranged to be selected by the user for the retrieval of more detailed map data.

17. A terminal according to claim 16 wherein four keys in the keyboard have been arranged to function as a means for selecting a map section the quadtree.

18. A terminal according to claim 16 wherein the terminal comprises a means for selecting a map section of the quadtree using a voice command.

19. A terminal according to claim 15 wherein part of its memory has been allocated to save user-specific information that does not belong to the map data.

20. A terminal according to claim 15 wherein the means for determining the geographical position the terminal comprises a GPS positioning device.

* * * * *